Oct. 2, 1956 R. D. HOFFMAN 2,764,813
CARTRIDGE-POWERED COW DEHORNER
Filed May 7, 1954 2 Sheets-Sheet 2
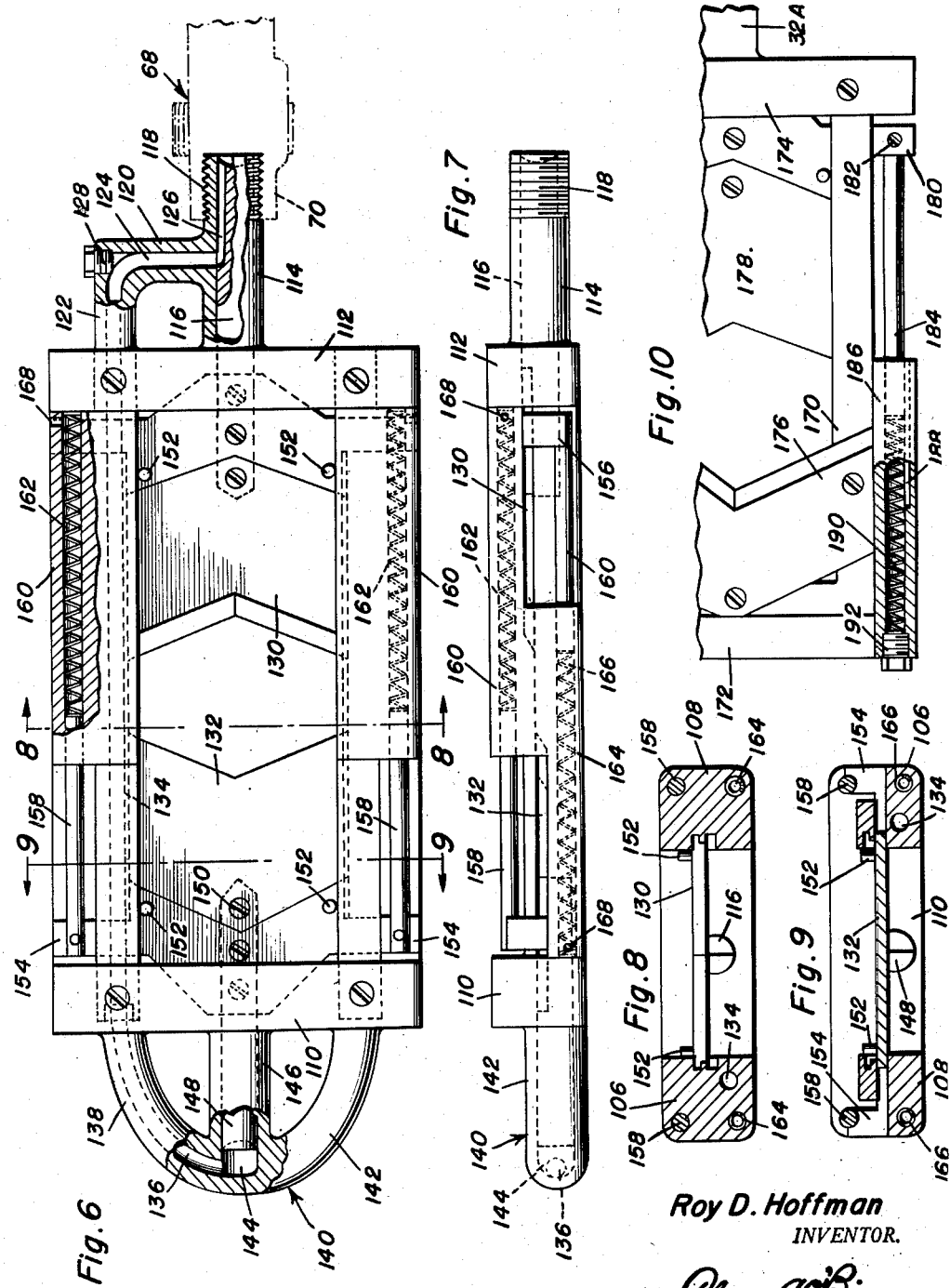
Roy D. Hoffman
INVENTOR.
BY
Attorneys

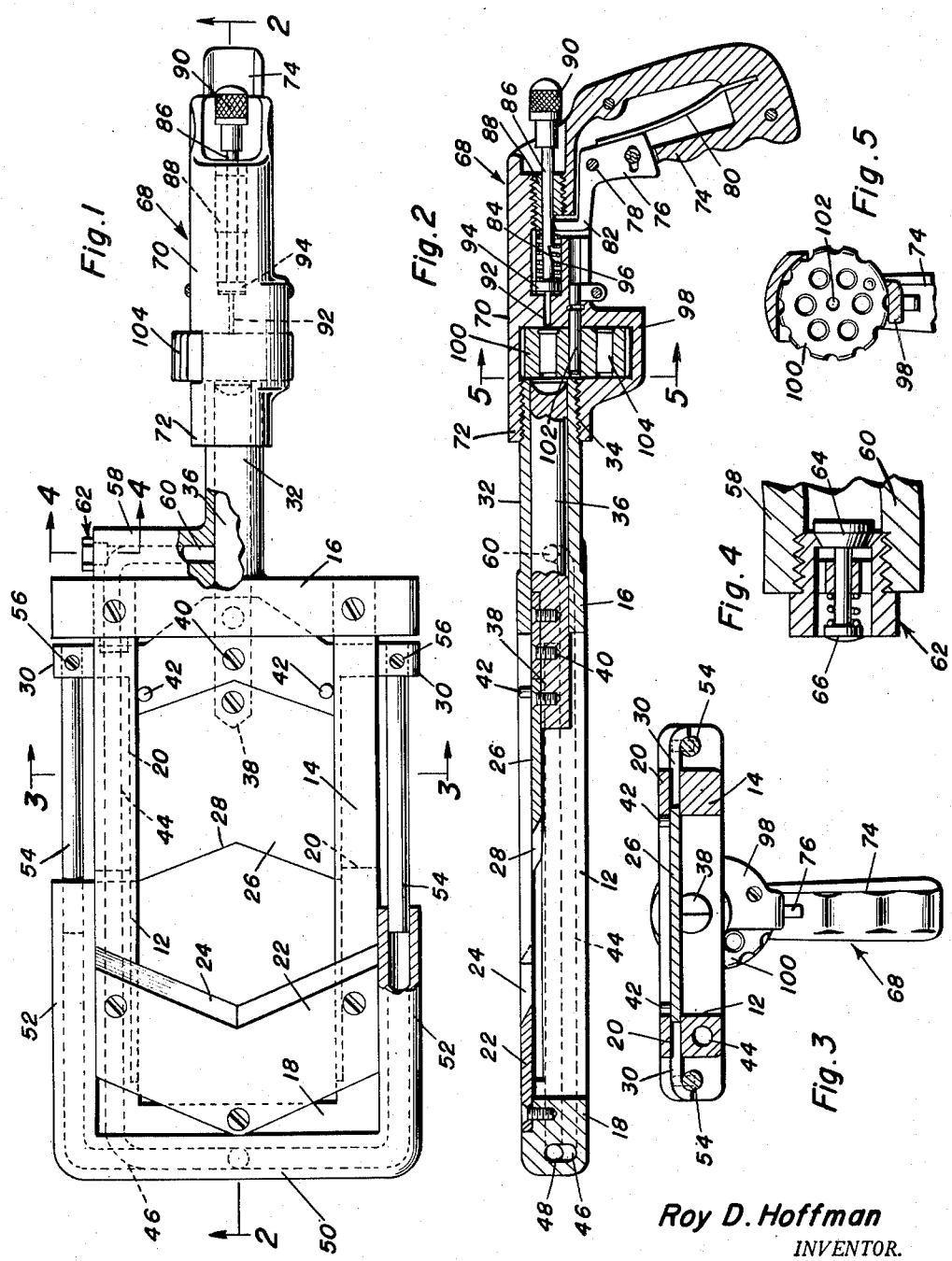

United States Patent Office 2,764,813
Patented Oct. 2, 1956

2,764,813

CARTRIDGE-POWERED COW DEHORNER

Roy D. Hoffman, Bedford, Pa.

Application May 7, 1954, Serial No. 428,186

11 Claims. (Cl. 30—228)

The present invention relates to certain new and useful improvements in a cow dehorner, a type which is characterized, generally speaking, by a rigid frame provided with shearing type cutter blades operable within the confines of the frame, and the principal object of the invention is to dispense with the usual manually actuatable mechanical means and to substitute therefor gun-type force-powered means with a view toward improving the over-all effectiveness of the dehorner.

There has long existed a need for an improved power-operated dehorner. In carrying out practicable and feasible ideas to effectually achieve desired ends, at least one of the cutter blades is provided with a driving piston, the latter being caused to slide in a cylinder-barrel integrated with the frame, the latter being designed to accommodate the source of power, for example, a gun in which the force needed is derived from pressurized air, oil, spring or force generated by the explosion of a cartridge.

Although a gun of one type or another may be attached to the stated cylinder-barrel, the preferred embodiment of the invention has to do with a cartridge-powered gun which is hereinafter referred to as a readily attachable and detachable revolver in which blank cartridges are fired to impose the impact of the explosive forces against the cooperating outer end of the piston in a manner to "shoot" the sliding cutter blade toward the cooperating cutter blade, and to thus bring about the desired horn shearing result.

More specifically described, the invention in its preferred form is characterized by a portable frame, a pair of cooperating cutter blades, the usual flat type with V-shaped cutting edges mounted in the frame, at least one of said blades being slidable toward and from the other blade. The slide blade has a piston affixed to the driving end thereof and the piston is slidable in a barrel projecting from the cooperating end of the frame. The outer end of the barrel is screw threaded to accommodate a short, internally screw threaded barrel on the hand-fired revolver. Firing the revolver in an obvious manner serves to generate forces sufficient to propel the blade toward its cooperating mate, all in a simple, effective and reliable manner and the horn acted on is severed by a quick keen cleavage and shearing action.

Another object of the invention is to provide blade-checking and buffer means to limit the travel of the blade in one direction relative to the frame and which, although it may be of some other construction, is preferably characterized by spaced parallel cylinders fixed to opposite side members of the frame, said blade having piston rods fixed thereto and said piston rods being reciprocable in their respective cylinders and said cylinders being such in construction that the rods are brought to an effective stop, with the result that the cutter blades cannot be driven to a position which would damage the cutting edge or perhaps disrupt the blades or parts of the frame.

More explicitly, it is within the purview of the invention to provide cushioning springs in the stated buffer cylinders, to charge the same with compressed air functioning as a cushioning medium, or to construct each cylinder and piston in the form of a dashpot.

A still further object of the invention is to provide a frame in which both cutter blades are slidingly mounted and wherein each cutter blade is provided at its outer end with a piston operating in a complemental barrel, means being provided whereby both pistons and blades are simultaneously powered for more powerful shearing results.

Other objects, features, and advantages than those above set forth will become evident from the following detailed description and subjoined claims.

In the accompanying drawings, wherein like numerals are employed to designate like parts throughout the various views:

Figure 1 is a plan view with portions appearing in section, illustrating one embodiment of the invention and showing the gun attached and in readiness for use.

Figure 2 is a central longitudinal sectional view with portions in elevation, taken on the line 2—2 of Figure 1 looking in the direction of the arrows.

Figure 3 is a cross-section on the line 3—3 of Figure 1, looking in the direction of the arrows.

Figure 4 is an enlarged fragmentary sectional and elevational view taken on the line 4—4 of Figure 1 looking in the direction of the arrows.

Figure 5 is a section on the vertical line 5—5 of Figure 2, looking in the direction of the arrows.

Figure 6 is a plan view, similar to Figure 1, showing a modification in construction wherein both cutter blades are slidably mounted in the frame.

Figure 7 is an edge elevation of the construction shown in Figure 6.

Figures 8 and 9 are sections on the lines 8—8 and 9—9 of Figure 6, looking in the direction of the respective arrows.

Figure 10 is a fragmentary sectional and elevational view of a modification of the cushioning means shown, for example, in Figure 1.

With reference first to Figures 1 to 5, inclusive, wherein one form of the invention is illustrated, it will be seen that the frame is rectangular in plan and is characterized by a pair of spaced parallel side frame members 12 and 14, an inner transverse end member 16, and an outer transverse end member 18. The side members are provided with suitable guideways or guides and these may be described, specifically in Figure 3, as slots 20—20. The fixed blades 22 at the left-hand end in the drawing is in one plane with its customary V-shaped cutting edge 24. The movable or slidable cutter blade is denoted by the numeral 26 and it is in a lower plane as shown in Figure 2 with its V-shaped cutting edge 28 cooperable with the cutting edge 24. The right-hand end portion of the blade 26 is provided with outstanding lug-like extensions 30—30 which are slidable in the guides or trackways 20—20, as perhaps better shown in Figure 3. The transverse end member 16 is provided at its central portion with a laterally projecting cylindrical barrel 32 having a screw threaded terminal end 34 as better shown in Figure 2. This serves to accommodate the reciprocating piston 36 which as shown in Figure 2 has an extension 38 underlying the blade and detachably secured thereto, as at 40.

For steadying the sliding operation of the blade 26, it is provided with stabilizing pins 42 which ride in firm sliding contact with the inner adjacent surfaces of the side members 12 and 14. The side member 12 is provided with a central or axial bore which extends therethrough and provides a passage 44. This passage has a lateral branch 46 at the left in Figure 1 and it communicates with an adjacent portion of a U-shaped passage denoted at 48. This passage is formed in the portions 50 and 52—52, which latter portions constitute buffer or cushioning cylinders as previously touched upon. These cylinders serve to accommodate the reciprocating piston rods 54—54 secured as at 56—56 to the aforementioned sliding and guiding lugs 30—30. Referring again to the end member 16 and with reference to Figure 1, it will be seen that the barrel 32 has an auxiliary lateral extension 58 which has a bore or passage which may be conveniently called a by-pass 60. This has communication at one end with the barrel 32 and at its opposite end with the intake end of the passage 44. It may be stated in this connection that when the right-hand end of the piston 36 passes from right to left in relation to the by-pass 60, a portion of the compressed charge, or explosive gases, passes through 60, 44, 46, and into the passageways 48 and the cylinders 52—52 to build up compressed air cushions which check the sliding movement of the piston rods 54—54 from right to left. Obviously, this checks the stroke or sliding movement of the sliding cutter blade 26, preventing the aforementioned damage thereto. It is desirable to have a valve, such as the check valve 62 (Fig. 4), in the by-pass branch 58 so as to release the vacuum and permit return of the sliding blade 26 and its piston 36 to an initial operating position. Any suitable check valve may be employed such as the one seen and which comprises a fitting screwed into the branch 58 and having a spring-held check valve 64 and a finger button 66 handily arranged for accessible operation. All that is necessary is to press the button and to release the vacuum so that the parts may be returned to initial operating position.

As already stated, a "gun" of one type or another is employed to build up the explosive pressure or forces necessary to drive the piston 36 from right to left in its cylinder 32. The preferred embodiment comprises the readily attachable and detachable, simplified revolver denoted generally by the numeral 68. This comprises an appropriate body or stock 70 having an internally screw threaded short barrel 72 at one end which screws onto the screw threaded end of the barrel 32. The opposite end of the stock is provided with a pistol grip denoted generally at 74 and provided with a trigger 76 pivoted at 78 and a trigger spring 80. The trigger has a latch 82 engageable with a keeper or shoulder 84 on the firing pin 86. The firing pin is operable through a bushing 88 and is provided with a finger grip 90 at the accessible right-hand end. The effective end of the firing pin is denoted at 92 and is operable by a flange 94 which is in turn operated by the coil spring 96. There is an appropriately constructed breech 98 on the intermediate portion of the stock which accommodates the chambered cylinder 100 held in place by the retractable axle pin 102. This arrangement allows the cylinder to be inserted and removed and the chambers in the cylinder serve to accommodate the blank cartridges 104 which, when fired, produce the desired explosive pressure to drive the piston 36.

In operation, it will be understood that the revolver is loaded in customary fashion after having been attached to the barrel 32 by way of its complemental attaching barrel 72. With the blades in the position shown in Figures 1 and 2, it will be evident that when the revolver is fired, the explosive pressures built up will impact the piston 36 and drive the same in a direction from right to left and will, in turn, drive the cutter blade 26 toward the cutter blade 22, providing the desired shearing results. As the right-hand end of the piston 36 registers with the by-pass passage 60, the compressed air resulting from the explosive charge will travel through the by-pass, the passage 44, and component portions 46 and 48, and into the cylinders 52—52, thus building up the desired compressed air cushions in the cylinders to check the travel of the piston rods 54—54 in the cylinders 52—52.

The same basic principles of construction are found in the modification appearing in Figures 6 to 9, inclusive, and reference thereto will show that the longitudinal side members are denoted by the numerals 106 and 108, these connected by transverse end members 110 and 112. The end member 112 is provided with a central outstanding barrel 114 to accommodate the piston 116 which barrel is screw threaded as at 118 to accommodate the revolver or gun 68. Here there is an L-shaped complement having branches 120 and 122 with a passage 124 registering with a groove 126 in the piston. The numeral 128 denotes generally the vacuum relief valve. The cutting blade connected to the piston 116 is denoted by the numeral 130 and the other cutting blade is denoted at 132. Here both blades are slidably mounted in guides provided therefor in the side members 106 and 108 as shown in Figures 8 and 9. There is a gas or pressure passage 134 in the side member 106 which registers with the passage 124 and it affords communication with a complemental passage 136 (see Figure 6) formed in the portion 138 of the substantially U-shaped yoke 140. The other portion 142 is solid and this yoke is connected to the transverse end member 110 in the manner shown in the drawings. It also has communicating connection as at 144 with a barrel 146 for the piston 148 which is connected with the blade 132 as at 150.

Incidentally, the blades 130 and 132 are provided with appropriate guide pins 152 which are in slidable contact with the side members of the frame structure. Then, too, the blades are provided with outstanding lugs 154—154 on the blade 32 and 156—156 on the blade 130 and these lugs are in turn provided with piston rods 158—158 and 160—160 which operate in buffer or cushioning cylinders therefor. The cylinders are formed integrally with the side members and the upper cylinders 160—160 are provided with coil springs 162—162 to accommodate the rods 158—158. The lower cylinders 164—164 serve to accommodate coil springs 166 and in turn accommodate the piston rods 160—160. The ports 168 are vents to release the vacuum as is thought to be necessary in permitting the respective blades 130 and 132 to return to their open or ready-to-shear positions.

With this arrangement, it will be obvious that a single revolver may be attached to the cylinder 114 at the right in Figure 6. When the charge is fired, the pressure acts against the piston 116 to drive the blade 130 and a portion of the pressure passes through the groove 126 and through the passage 120, the passage 134 and complemental passage 136 at the left in Figure 6 to act on the piston 148. Thus, both pistons are simultaneously acted on and both blades are caused to come together at approximately the same instant, thus effecting the desired shearing results. Both blades are cushioned by the respective pairs of cushioning cylinders and piston rods operating in their respective cylinders, as is obvious.

Any suitable means, not detailed, may be employed to assist in returning the blades to their original set or initial position, as is evident. It is also thought to be within the purview of this form of the invention to provide individual revolvers for both cylinders 114 and 146, respectively, and to appropriately fire the same electrically or otherwise to bring about the simultaneously pressurized operation of the blades 130 and 132.

Instead of employing the air cushioned cylinders 52—52 in Figure 1, it is within the purview of the invention to utilize spring-loaded cylinders. This is brought out in Figure 10 which is a fragmentary view and shows one frame side member 170 and a pair of end members 172 and 174, the end member 174 provided with a cylinder 32-A. Here the fixed blade is denoted at 176 and the movable blade at 178, and this is provided with an extension 180 secured at 182 to a piston rod 184 operating in the fixed cylinder 186. This cylinder is appropriately vented as at 188 and is provided with an insertable and removable coil spring 190 held in place by a screw plug 192. This is merely an alternative buffer arrangement for the slidable blade 178 as is clear.

It is believed that a careful consideration of the specification and claims in conjunction with the illustrative drawings will enable the reader to obtain a clear and comprehensive understanding of the subject matter of the invention, the construction of parts and the operation thereof. In these circumstances, a more extensive description is believed to be unnecessary.

Changes in shape, size and rearrangement of parts may be resorted to in actual practice so long as they remain within the spirit of the invention and scope of the subjoined claims.

What is claimed as new is as follows:

1. A cow dehorner comprising a portable frame, a pair of cooperating cutter blades located for operation within the inner marginal limits of said frame, adjacent ends of said blades having overlapping cutting edges which, as they overlap, bring about the desired horn shearing result, at least one of said blades being stationary and the other blade being propelled and slidable at high speed toward the stationary blade, gas powered piston means operatively mounted on said frame and with the piston thereof positively and operatively connected with said slidable blade, blank cartridge containing and firing means communicatively and operatively connected with said gas powered piston means and designed, when the cartridge is fired, to generate the intended and necessary pressured charge of gas and to thus bring about the desired high speed operation of the piston means and companion slidable blade, and additional means limitary in nature and construction and functioning to limit the travel of the slidable blade in a direction toward the stationary blade in a manner to gradually check and bring the slidable blade to a stop and to in this manner prevent the cutting edge of the slidable blade from moving to a position beyond its intended limit so as to thus prevent damage to said cutting edge.

2. A cow dehorner comprising a portable frame, a pair of cooperating cutter blades located for operation within the inner marginal limits of said frame, adjacent ends of said blades having overlapping cutting edges which, as they overlap, bring about the desired horn shearing result, at least one of said blades being stationary and the other blade being propelled and slidable at high speed toward the stationary blade, gas powered piston means operatively mounted on said frame and with the piston thereof positively and operatively connected with said slidable blade, blank cartridge containing and firing means communicatively and operatively connected with said gas powered piston means and designed, when the cartridge is fired, to generate the intended and necessary pressured charge of gas and to thus bring about the desired high speed operation of the piston means and companion slidable blade, additional means limitary in nature and construction and functioning to limit the travel of the slidable blade in a direction toward the stationary blade in a manner to gradually check and bring the slidable blade to a stop and to in this manner prevent the cutting edge of the slidable blade from moving to a position beyond its intended limit so as to thus prevent damage to said cutting edge, said additional means embodying cylinders fixed on said frame, and piston rods fastened to said slidable cutter blade and reciprocable in their respective cylinders.

3. The structure defined in claim 2, and wherein further means is provided on said frame for by-passing and delivering exploded pressurized gases into said cylinders to check and cushion the movement of the piston rods into their respective cylinders.

4. A cow dehorner comprising a portable frame, a pair of cooperating cutter blades in said frame, at least one of said blades being slidable toward and from the other blade, and gas pressure generating means carried by said frame and operatively connected to said slidable blade, said means comprising a barrel fixed to and projecting beyond one end of said frame, a piston reciprocable in said barrel with one end joined to said slidable cutter blade and the other end arranged to receive the driving impact of an exploded charge of gas, a revolver having a barrel detachably mounted on said first named barrel and in which a blank cartridge is held and fired, and means cooperable with said piston, and slidable blade for gradually checking and bringing the movement of the sliding blade to a stop and thus preventing damage of the cutting edge thereon.

5. A cow dehorner comprising a portable frame, a pair of cooperating cutter blades in said frame, at least one of said blades being slidable toward and from the other blade, and gas pressure generating means carried by said frame and operatively connected to said slidable blade, said means comprising a barrel fixed to and projecting beyond one end of said frame, a piston reciprocable in said barrel with one end joined to said sliding cutter blade and the other end arranged to receive the driving impact of the exploded charge, and a revolver detachably mounted on said barrel, said revolver embodying a stock with a breech and rotatable chambered cartridge holding cylinder, a spring-biased firing pin, a pistol-grip, and a spring-returned pivoted trigger mounted in said grip and releasably cooperable with said firing pin and additional means carried by said frame and limitary in construction and functioning and serving to limit the travel of the slidable blade toward the complemental blade in a manner to gradually check and satisfactorily bring said slidable blade to a stop at a predetermined point in its stroke of operation and to thus prevent damage to the cutting edge of said slidable blade.

6. The structure defined in claim 5, and wherein said additional means comprises a pair of spaced parallel cylinders fixed on opposite sides of said frame, a piston rod operable in each cylinder, and said rods being connected to said slidable cutter blade for operation in conjunction therewith.

7. The structure defined in claim 6 and shock absorbing and check means in each cylinder acting as a buffer and limiting the stroke of each piston rod in one direction.

8. The structure defined in claim 7 and wherein said means is a coil spring interposed between the closed end of the cylinder and the forward end of the complemental piston rod.

9. A cow dehorner comprising a portable generally rectangular frame having transverse end members and longitudinal side members, said side members having lengthwise guide slots therein, one of said transverse end members having an integral outwardly projecting barrel screw-threaded at its outer end, a first cutter blade fixedly mounted in said frame adjacent to the other transverse end member, a second cutter blade adjacent to one transverse end member and having end portions slidably keyed in said guide slots, a piston secured centrally to said latter cutter blade and operable in said barrel, cylinders mounted on opposite sides of said frame and paralleling the longitudinal side members, and piston rods secured to end portions of said second cutter blade and slidingly operable in said cylinders.

10. The structure defined in claim 9, and the combination therewith of a cartridge firing revolver having a stock with a short barrel internally screw-threaded and screwed on the screw-threaded end of said first-named barrel.

11. The structure defined in claim 9, and wherein one of said side members has an exploded gas passage extending therethrough and communicating wtih a complemental passage in said other transverse member, said cylinders having communication with said latter passage for directing and trapping the gases in one end portion of each cylinder, and a valved by-pass carried by said one transverse member and joined at one end with said barrel and at its opposite end with the inlet end of the gas passage in said one side member.

References Cited in the file of this patent

UNITED STATES PATENTS

| | | |
|---|---|---|
| 453,421 | Caldwell | June 2, 1891 |
| 2,008,362 | Littledale | July 16, 1935 |
| 2,017,329 | Temple | Oct. 15, 1935 |
| 2,257,245 | Rudolph | Sept. 30, 1941 |
| 2,446,994 | Barker | Aug. 17, 1948 |
| 2,687,572 | Matthews | Aug. 31, 1951 |
| 2,716,813 | Smyres | Sept. 6, 1955 |

FOREIGN PATENTS

| | | |
|---|---|---|
| 277,558 | Great Britain | Sept. 22, 1927 |